G. A. PHILLIPS.
METHOD OF MAKING IRON MOLDS OR CHILLS.
APPLICATION FILED FEB. 24, 1913.
1,099,997.
Patented June 16, 1914.
4 SHEETS—SHEET 1.
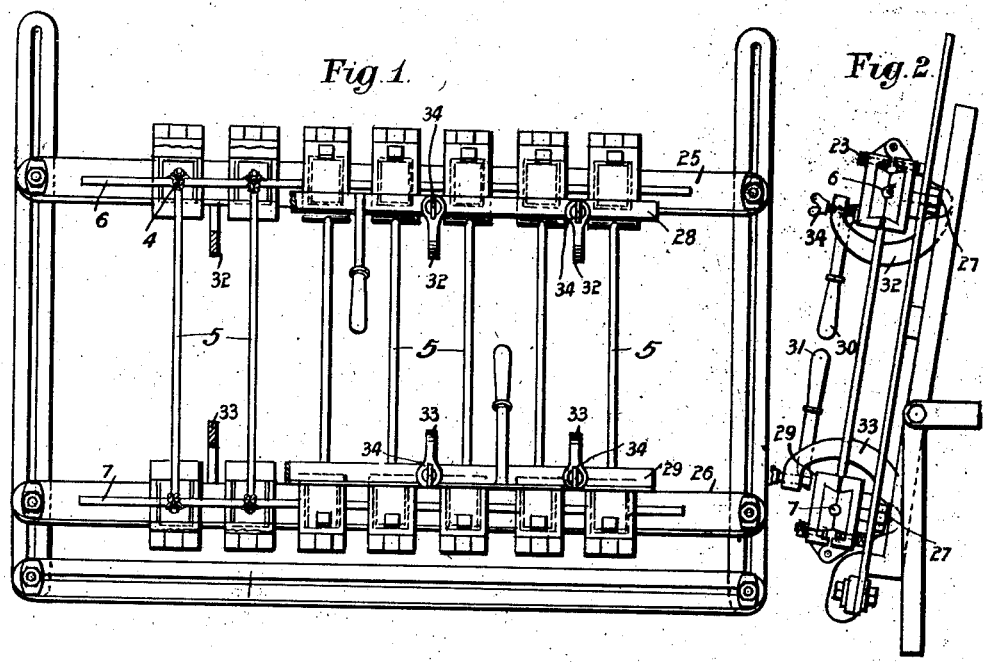
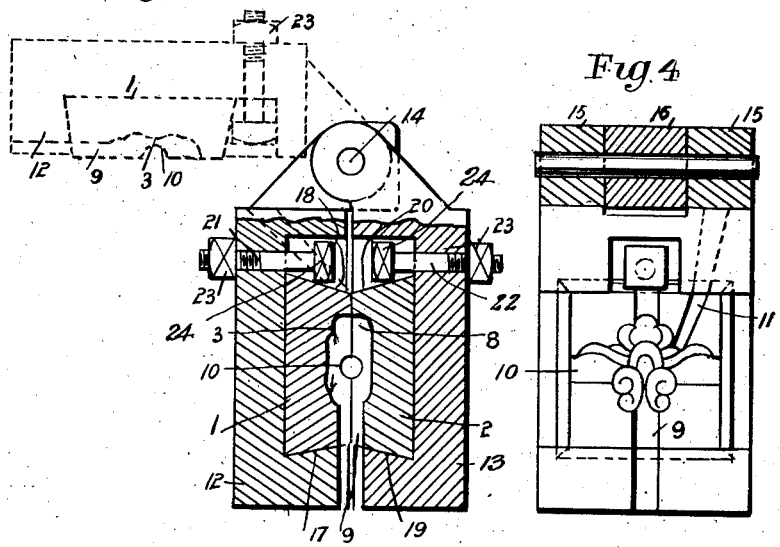
Witnesses
John C. Sanders
Albert F. Heiman
Inventor
Gerald Albert Phillips
By Wallace White
ATTY G. A. PHILLIPS.
METHOD OF MAKING IRON MOLDS OR CHILLS.
APPLICATION FILED FEB. 24, 1913.
1,099,997.
Patented June 16, 1914.
4 SHEETS—SHEET 2.
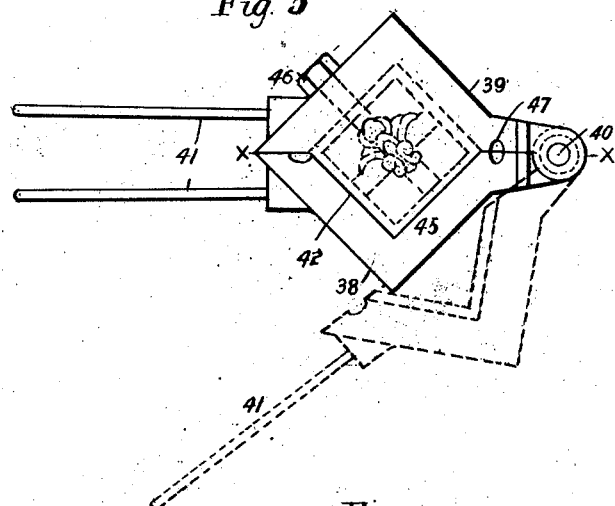
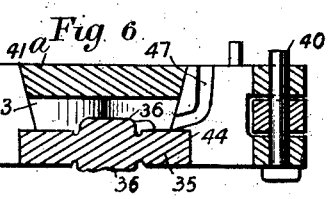
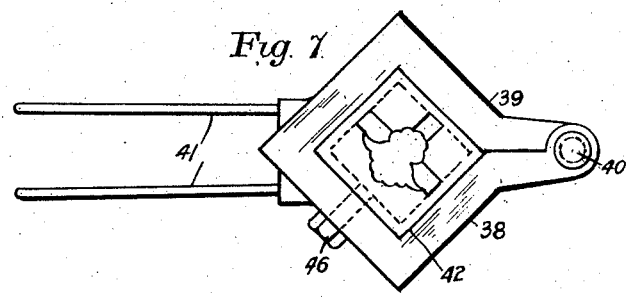
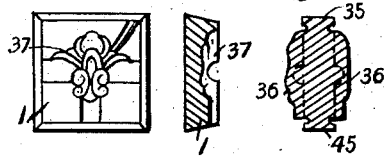
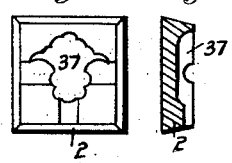
Witnesses.
John C. Sanders
Albert F. Newman
Inventor.
Gerald Albert Phillips
By M. Norreau White
ATT'Y G. A. PHILLIPS.
METHOD OF MAKING IRON MOLDS OR CHILLS
APPLICATION FILED FEB. 24, 1913.
1,099,997.
Patented June 16, 1914.
4 SHEETS—SHEET 3.
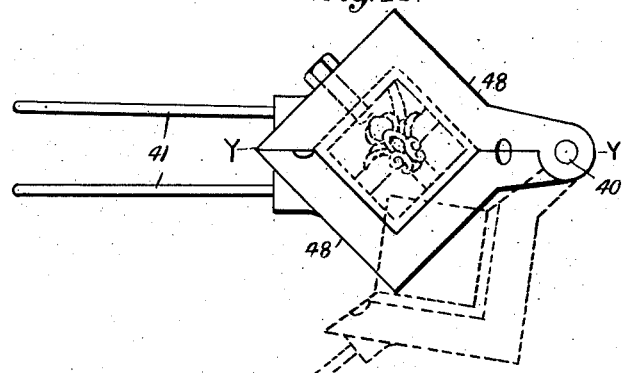
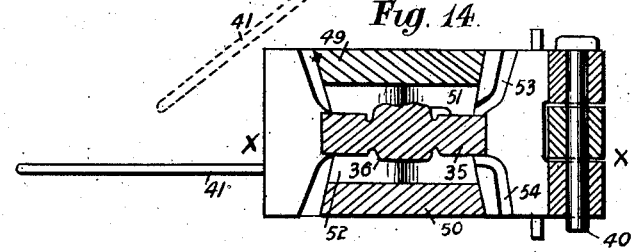
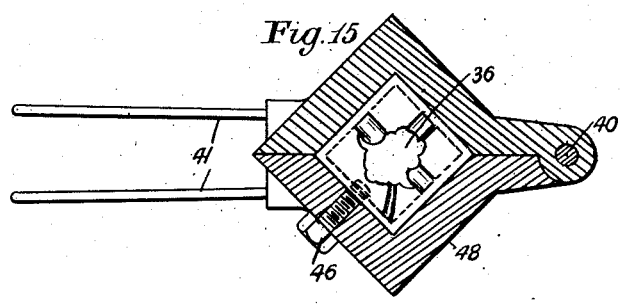
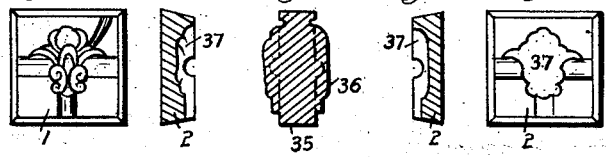
Witnesses
John C. Sanders
Albert F. Neuman
Inventor
Gerald Albert Phillips
By Wallace White
ATTY G. A. PHILLIPS.
METHOD OF MAKING IRON MOLDS OR CHILLS.
APPLICATION FILED FEB. 24, 1913.
1,099,997.
Patented June 16, 1914.
4 SHEETS—SHEET 4.
Fig. 21.
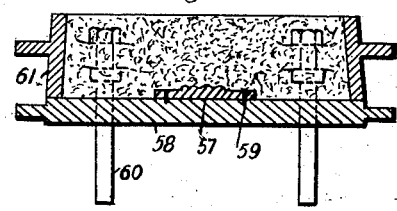
Fig. 24.
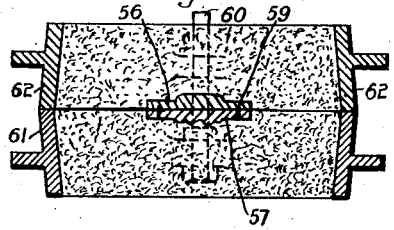
Fig. 23.
Fig. 22.
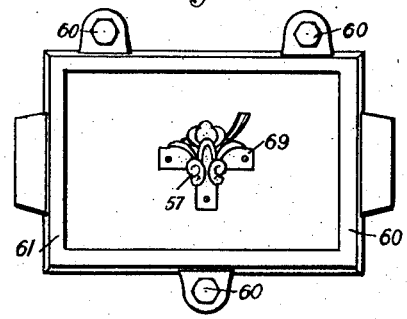
Fig. 25.
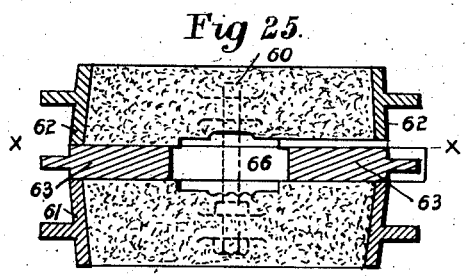
Fig. 26.
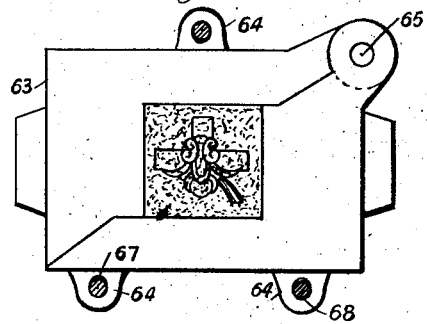
Fig. 27. Fig. 28.
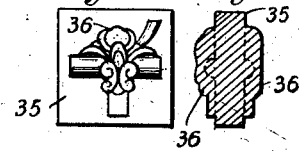
Fig. 29. Fig. 30.
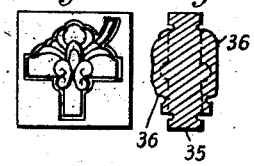
Fig. 31. Fig. 32. Fig. 33.
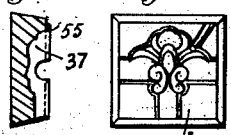
Fig. 23ª
Witnesses
John C. Sanders
Albert H. Neuman
Inventor
Gerald Albert Phillips
BY M. Wallace White
ATTY

UNITED STATES PATENT OFFICE.

GERALD ALBERT PHILLIPS, OF COVENTRY, ENGLAND.

METHOD OF MAKING IRON MOLDS OR CHILLS.

1,099,997. Specification of Letters Patent. Patented June 16, 1914.

Original application filed September 5, 1912, Serial No. 718,651. Divided and this application filed February 24, 1913. Serial No. 750,274.

*To all whom it may concern:*

Be it known that I, GERALD ALBERT PHILLIPS, of Speedwell Works, Sherborne street, in the city of Birmingham, England, a subject of His Majesty the King of Great Britain and Ireland, residing at Beechcote, Berkswell, Coventry, in the county of Warwick, England, have invented new and useful Improvements in the Method of Making Iron Molds or Chills, of which the following is a specification.

This invention has reference to a method of making those iron molds, technically known as chills, which are made in halves or otherwise in two or more parts and are used in the manufacture of metallic bedsteads and cots and for other like uses and which are adapted to receive the ends or other parts of tubes or bars or other castings or parts and to form inclosed or partly inclosed molds for the reception of molten cast iron which forms the chilled castings around said tubes, bars or parts to secure them together, as in the case of what are known as "flower chills" in a bedstead rail or cot rail, or to form a top or other casting on a pillar, or a corner casting on a pillar, or other chill casting where required in the construction of a metallic bedstead or other article of metallic furniture or other chilled iron casting. The halves or parts of the molds must match and fit accurately together and heretofore these iron molds or chills have usually been made as sand castings in halves which have been machined where necessary and fitted together and trimmed up and finished by hand or machine labor, the said half molds having internally the ornamental or other shape of the required cast part of the bedstead or other required chilled casting and also having one or more cross channels for the reception of the tube or tubes or other parts on to which the chilled casting is to be made. The present method of making these iron molds or chills is comparatively expensive as a large number of them are required for every different pattern of metallic bedstead or cot, and this is particularly the case with "flower chills" as in the simplest form of bedstead rail made with top and bottom tubes connected together by seven uprights, fourteen pairs of these flower chills all exactly alike are required to form the chilled castings connecting the ends of the upright tubes with the horizontals, one half of each pair being fixed by screws or other means to a frame at the proper distances apart and the other half of each pair being detachably connected to these by being hinged thereto or by chill hooks or by other suitable means. It follows therefore that a bedstead manufacturer has to keep many tons of these iron molds always in stock which have cost a very considerable sum to produce as every one of them has been fitted together and finished by hand or machine labor.

It is well known that in practice those portions of the iron molds or chills with which the molten iron comes into contact and particularly the edges of the recesses in the meeting faces of the iron molds or chills soon become indistinct and incorrect in shape. This wear and rounding off of the said edges of the recesses in the meeting faces of the chill molds causes a rib or ribs on the casting formed therein where the halves or parts of the chill molds meet. When this wear has taken place to a serious extent the chill molds are useless except as scrap iron or to be remelted.

This invention comprises improvements in the method of making the said half or part iron molds or chills whereby their first cost is very materially reduced, they are formed with absolutely sharp edges to the recesses of their meeting faces, the cost of their renewal is considerably reduced and moreover the weight of the iron molds or chills which it will be necessary for a bedstead manufacturer to keep in stock when made according to my invention will be reduced to a minimum.

In carrying out this invention these halves or parts of the said hollow iron molds or chills which are liable to wear through coming in contact with the molten metal and which chills or parts I call the "working" chill molds are not made as sand castings as heretofore but are made as chilled iron castings in iron molds or chills which for distinction I call the "master" pattern and from which any number of the said working chill molds can be made at a very small cost. The working chill molds are removably fixed in the stocks on the stock frame in such a way that they can very readily be changed when required. Thus in making for instance a set of say fourteen pairs of flower chill molds to be fixed on a stock frame for casting bedstead rails, two master patterns either separately or in one piece are first made as sand castings, one master pattern for each of the two half secondary flower chill molds, the pattern shape or configuration of these master patterns corresponding with the halves of the "working" flower chill molds which are required, and then from these master patterns which have been carefully finished the necessary number of halves of the working chill molds are cast, as chilled castings, of the proper shape to fit in the stocks or body portions of the molds which are shaped to receive them and are furnished with suitable means for holding the working chill molds in position, said stocks or body portions of the molds being adapted to be fixed to the stock frame.

The working chill half molds are interchangeable so that the same stocks or body portions of the molds will serve for holding different patterns of working chill half molds which latter are very inexpensive owing to the very small amount of labor required to produce them. The weight of the iron molds or chills which it will be necessary for a bedstead manufacturer to keep in stock will be represented by the weight of the master patterns which will be very small in comparison with the many tons of iron molds which bedstead manufacturers have heretofore had to hold.

The figures of the accompanying drawings illustrate by way of example how the method according to my invention is carried out in connection with the said flower chills for a metallic bedstead rail and they will serve to illustrate also how my invention can be applied to the chilled half or part molds for use in casting other chilled castings in the construction of metallic bedsteads or other articles of metallic furniture or other chilled iron castings.

Figure 1 is a front elevation of a stock frame with fourteen stocks or molds fixed thereon and fitted with detachable working flower chill molds in accordance with this invention arranged for casting a bedstead rail; Fig. 2 is a side elevation of the same; Fig. 3 shows separately on a large scale one of the stocks or bodies with the two detachable and renewable working flower chill molds fixed therein; Fig. 4 is a sectional front elevation of the same; Fig. 5 is a plan of a mold box complete with an interchangeable master pattern; Fig. 6 is a sectional elevation of the same taken on line X X of Fig. 5; Fig. 7 is an inverted plan of the arrangement shown in Figs. 5 and 6; Fig. 8 is a sectional elevation of the interchangeable master pattern; Fig. 9 is a front elevation of one of the working chill half molds shown in Fig. 3; Fig. 10 is a sectional side elevation of the working chill half mold shown in Fig. 9; Fig. 11 is a front elevation of another pattern of working half mold for use with the stocks or bodies shown in Figs. 1, 2, 3, and 5; Fig. 12 is a sectional side elevation of the same; Fig. 13 is a plan of a modified form of mold box complete with a master pattern and is adapted to form two working chill half molds at one setting; Fig. 14 is a sectional elevation of the same taken on line Y Y of Fig. 13; Fig. 15 is an inverted sectional plan of the same taken on line X X of Fig. 14; Fig. 16 is a sectional elevation of the interchangeable master pattern shown in Figs. 13, 14 and 15; Fig. 17 is a front elevation and Fig. 18 is a sectional side elevation of one of the working chill half molds which has been formed in the master pattern shown in Figs. 13, 14, and 15; Fig. 19 is a front elevation and Fig. 20 is a sectional side elevation of the other working chill half mold which has been formed in the master patterns shown in Figs. 13, 14, and 15; Fig. 21 is a sectional side elevation of one part of a two part sand molding box and half pattern, arranged for molding the master pattern shown in Fig. 16; Fig. 22 is a plan of Fig. 21 but with the sand removed from the box; Fig. 23 is one half of the pattern for the same; Fig. 23$^a$ is a modified form of the pattern shown in Fig. 23; Fig. 24 shows the two parts of the two part molding box and sand mold closed with the pattern therein; Fig. 25 shows the same two parts of the molding box separated and with a mold plate introduced between them to form the thick plate part of the interchangeable master pattern; Fig. 26 is a plan of the same with the top part of the box removed; Fig. 27 is a front elevation of the interchangeable master pattern as it leaves the mold plate; Fig. 28 is a sectional elevation of the same; Fig. 29 is a front elevation of the interchangeable master pattern when finished with a small groove cut around the raised pattern part for the purpose hereinafter described; Fig. 30 is a sectional elevation of Fig. 29; Fig. 31 is a sectional elevation of one of the halves of the working flower patterns in the form in which it leaves the master chill molds; Fig. 32 is a front elevation of the same and Fig. 33 is a sectional elevation of a portion of the same on an enlarged scale.

Referring first of all to Figs. 1, 2, 3, and 4, the two removable and renewable chilled cast iron working chill half molds are respectively marked 1 and 2, the working chill half mold 1 being recessed on its inner face at 3 to form the front of the required chill 4 of the bedstead rail where the vertical tubes 5 of the same meet the horizontal tubes 6 and 7 of the rail, the other working chill half mold 2 which matches the working chill half mold 1 has its recessed face 8 shaped to correspond with the back of the flower chill 4. Each of these working flower chill half molds also has the necessary groove 9 to receive the vertical tube 5 and grooves 10 to receive the horizontal tube 6. Each of the said working chill half molds 1, 2, also has formed in its face a groove 11 along which the metal runs as it is poured into the mold. These working chill half molds 1, 2, are respectively removably fixed in the two half stocks or body portions 12, 13, which are sand castings jointed together at one side by a joint pin 14 passing through knuckle lugs 15, 16, formed respectively on the two half stocks 12, 13, so that the half stocks can be turned on the joint pin 14 and opened apart as indicated by the dotted lines in Fig. 3. The preferred means of holding the working chill half molds 1, 2, in the corresponding halves of the stock is by the working chill half molds being made with somewhat of a dovetailed shape in cross section, see Fig. 3, with tapering sides 17, 18, 19, 20, which fit in corresponding recesses in the half stocks 12, 13, and where they are respectively secured by the two bolts 21, 22, which pass through the half stocks 12, 13 and are furnished with nuts 23 on their outer ends so that when these are tightened up the heads 24 of the bolts bearing against the tapering sides 18, 20, securely hold the working chill half molds 1, 2, in the dovetailed recesses. The necessary number of these stocks fitted with the working chill half molds 1, 2, as above described are fixed to the stock frame (see Figs. 1 and 2). For a bedstead rail which has seven upright tubes there are fourteen of these stocks with their corresponding working chill half molds seven being fixed to each of the horizontal flat bars 25, of the stock frames, said stocks being fixed thereto by studs 27 passing through the bars. The other halves 12 of the seven stocks in a row are bolted respectively to the two bars 28, 29, so that all those half stocks in a row will be opened together, each bar being furnished with a handle such as 30, 31, for this purpose. Suitable cramps 32, 33, are employed at intervals jointed to the bars 25, 26, and made with screws 34 to bear upon the bars 28, 29, and maintain the stocks closed while pouring.

I will now describe the construction of the master patterns and the box like part in which they are fixed to form the complete mold when casting the working chill half molds 1, 2. A mold box fitted with a master pattern for this purpose is illustrated by Figs. 5, 6, and 7. This master pattern 35 is interchangeable and is made with a part which has in relief the flower 36 or other pattern part or parts which are required to form the recesses in the working chill half molds. The said interchangeable master patterns are iron castings made like what is known as a "plate" pattern that is, with a plate having projecting from its opposite faces and in exact positions relatively to one another the pattern parts 36 corresponding with the recessed portions 37 of the working chill half molds. The plate part of the master pattern 35 is of square or other convenient shape and is adapted to fit in the surrounding mold box aforesaid which is by preference made in halves 38, 39, hinged together by a pivot pin 40, and formed with handles 41 so as to be readily opened apart and also provided with a suitable form of clip by which the two halves can be retained in the closed position. The mold box is closed on one face 41ª and is made with a recess 42 in the other face in which the said plate part of the master pattern 35 fits so that the cavity 43 between this plate part 35 and the closed face 41ª of the mold box is adapted to receive the molten iron, the ornamental recessed face 37 of which will be formed by the pattern parts 36 projecting from the interchangeable master pattern 35.

Before casting the other working chill half mold, the master pattern 35 has to be turned half around and fixed with its other face adjacent to the cavity 43 in the interior of the mold box. The recess 42 in the mold box in which the master pattern 35 is fixed is made with an internal straight edge 44 and all the master patterns are made with a corresponding straight edge 45 to correspond therewith, and against said internal straight edge 44 the straight edge 45 of the master pattern is forced by one or more set screws 46 or other suitable means so that the said master patterns are always in their correct positions for casting. The channel through which the molten metal is poured is denoted by 47. While the above description refers to a mold box for holding a master pattern by which the master pattern has to be reversed for casting a corresponding pair of working chill half molds, it will be obvious that the arrangement may be modified as shown in Figs. 13 to 15 in which the mold box 48 is closed on both faces 49, 50, and the master pattern 36 is inserted in the middle of the mold box so as to form two cavities 51, 52, in which the respective halves of the working chill molds are cast. Two channels 53, 54, are provided one leading to the cavity 51 and one to the cavity 52. After the master pattern 35 has been fixed in the mold box by the set screw 46 the molten al is poured into the cavity 51 and as soon as the iron is set the mold box complete with the master pattern is reversed and the cavity 52 filled through the channel 54. After cooling the two halves of the mold box are opened as shown in dotted lines in Fig. 13 when the master pattern and the working chill half molds can be removed.

To insure as aforesaid absolutely sharp or angular edges at the faces of the recessed portions of the working chill half molds 1, 2, the master pattern is grooved slightly all around the flower or ornamental or other pattern parts 36 which project from the face of the plate part 35 of the master pattern as shown in Figs. 8, 16, and 30, so that when the halves of the working chill molds are cast as aforesaid the molten metal will run into this groove or grooves, and thereby form a rib or ribs 55 (Fig. 31) projecting up above the faces of the working chill half molds all around and bordering the recess or recesses therein, as shown to an enlarged scale in Fig. 33. This rib or ribs 55 and if necessary a part of the face of the working chill half mold are then removed by grinding thereby leaving the edges of the faces of the recess or recesses absolutely sharp or angular as is necessary to insure that the halves of each pair of working chill molds fit properly together to prevent any ribs on the finished bedsteads or like castings which are cast in the complete working chill molds.

In forming the interchangeable master pattern the ordinary lead flower chill Fig. 24, or other casting pattern which is made in halves as is usual is molded in sand in a two part box. In order to insure that the lead pattern shall occupy its proper position in the said two part box, one half 57 of the said pattern is detachably fixed on a plate 58 by dowel pins 59 or the like, this plate 58 having perforated ears through which the pegs 60 of the one half molding box 61 pass so that this half box 61 is exactly located in relation to the half lead pattern 57 see Fig. 21. When this part 61 of the box with the half pattern 57 therein has been filled with sand and rammed in the usual way as shown in Fig. 21, said half box 61 with the impression therein is removed from the plate 58, after which the half pattern 57 is lifted off the plate and replaced in the half mold impression. The other half 56 of the lead pattern is then placed on the first half 57 and the other half molding box 62 is placed on the first half 61 which has been molded, as shown in Fig. 24, being finally filled with sand and rammed. This method insures the pattern coming in its exact required position in the box. The two halves 61, 62, of the molding box are separated and between them is now introduced the plate 63 which is of the same thickness as the plate portion of the interchangeable master pattern 35. The said plate 63 has an aperture therethrough which corresponds with the outline shape of the master pattern. The said plate 63 is made with lugs 64 having holes which fit on to the upstanding pegs 60 on the bottom box 61, the upper half 62 of the box resting on the upper face of the perforated plate 63. The pegs 60 are by preference made parallel and the half molding boxes are nicely fitted together so that when the top box 62 is placed on the perforated plate 63 the half mold in the top box will be exactly opposite the half mold in the bottom box. The casting is then poured, the box opened and the master chill casting removed from the aperture 66 in the plate 63. The plate 63 is preferably made with its parts separable so that the master chill casting can be readily removed such for instance as by hinging the two parts together at 65 or in any other suitable way. In order to allow for the expansion of the said intermediate plate 63 arising from its contact with the hot metal in the aperture 66 the holes in the lugs 64 of the plate 63 are so slotted or formed at 67 as to bear upon the outer surfaces 68 of the pegs of the molding box to properly locate the intermediate plate 63 thereon, sufficient clearance being left on the inner sides of the pegs to properly allow for the expansion of the plate.

In order to make those working chill half molds which are all of the same pattern but in which the channels for the tubes or bars are in different angles and positions, as is required for instance in a bedstead rail in which the top tube is curved instead of being a horizontal straight tube as in Fig. 1, either the lead pattern 56, 57, or the master pattern, or both, has its print parts 69 for the tubes or bars 6 made at the proper angles or positions to suit the working chill half molds required, and to effect this these print parts 69 may if desired be made adjustable in position to occupy various angles with the main portion of the chill as indicated for instance in Fig. 23ª which shows a lead pattern like that shown in Fig. 23 but having its two side prints 70 for the top tube arranged inclined to the vertical instead as in Fig. 23 being at right angles thereto.

What I claim as my invention, and desire to secure by Letters Patent is:—

1. A method of producing iron half or part chill molds wherein are cast parts of metallic bedsteads or other metallic furniture, consisting in forming an iron master pattern having grooves around the ornamentation or design, casting from said master pattern in a chill mold, working half or part chill molds having ribs thereon corresponding to said grooves, grinding off said ribs so as to insure sharp edges to the recesses in the half or part molds thus enabling them to fit accurately together to form a cavity wherein the final castings are cast without fin or bur.

2. A method of making iron half or part molds adapted to fit or match together to form a cavity wherein are cast the parts of metallic bedsteads or other metallic furniture, or other chill castings, whereby a finished iron master pattern is formed by molding in a two part box a cavity of the required shape, separating the parts of said box and inserting a distance plate therebetween, running molten metal into such cavity, and then casting in or against the finished iron master pattern thus formed the working half or part molds.

3. A method of making iron half or part molds adapted to fit or match together to form a cavity wherein are cast the parts of metallic bedsteads or other metallic furniture, or other chill castings, in which a half or part molding box and a half or part original pattern are temporarily secured to a plate in definite relation thereto, and sand is placed in said molding box and adapted to form a cavity corresponding with the said half or part original pattern, said box being inverted and the said plate removed; and in which the other half or part original pattern is temporarily fixed to the first half in exact relative position thereto, the top molding box is placed on the bottom molding box and the mold completed, the two molding boxes being separated and a distance plate inserted therebetween; and in which an iron master pattern is cast in the cavity thus formed and the working half or part molds are cast in or against the finished iron master pattern.

4. A method of making sharp edges to the recessed parts of iron half or part molds adapted to fit or match together to form a cavity wherein are cast the parts of metallic bedsteads or other metallic furniture, or other chill castings, by casting the said molds with ribs around the margins of the said recesses and afterward grinding off the said ribs.

5. A method of making sharp edges to the recessed parts of iron half or part molds adapted to fit or match together to form a cavity wherein are cast the parts of metallic bedsteads or other metallic furniture, or other chill castings, by forming a recess or recesses around the pattern part or parts of a finished master pattern, casting working half or part molds from said master pattern, and grinding off the rib or ribs thus formed at the margins of the recessed parts of the working half or part molds.

In testimony whereof I have signed my name to this specification in the presence of two subscribing witnesses.

GERALD ALBERT PHILLIPS.

Witnesses:
    BERTHA MATILDA DEELEY,
    CHARLES BOSWORTH KETLEY.